United States Patent [19]

Mayhew

[11] 3,815,701

[45] June 11, 1974

[54] HOOD PIVOT FOR DETACHABLY CONNECTING A TRACTOR HOOD TO A TRACTOR FRAME

[75] Inventor: Roger D. Mayhew, Fredonia, Wis.

[73] Assignee: FMC Corporation, San Jose, Calif.

[22] Filed: Oct. 5, 1972

[21] Appl. No.: 299,549

[52] U.S. Cl................ 180/69 C, 16/128.1, 16/172
[51] Int. Cl............................................ B62d 25/12
[58] Field of Search .... 180/69 C, 69 R, 54 A, 54 F; 16/128.1, 171, 172; 220/38; 217/59

[56] References Cited
UNITED STATES PATENTS

| 1,598,868 | 9/1926 | Lundelius | 180/69 C |
| 2,570,992 | 10/1951 | Thomas | 16/128.1 |
| 2,952,328 | 9/1960 | Steiner | 180/69 R |
| 3,204,288 | 9/1965 | Adams | 16/172 |

*Primary Examiner*—Leo Friaglia
*Assistant Examiner*—Milton L. Smith
*Attorney, Agent, or Firm*—C. E. Tripp

[57] ABSTRACT

A hood pivot bracket secured to the front end of the frame of a garden and lawn tractor is used to allow ready attachment and detachment of the tractor hood to or from the tractor frame. The lower front end of the hood is pivotally retained by the bracket and can be swung forward about the bracket to an angular position wherein the hood can be pulled forward to detach the hood from the bracket and frame.

9 Claims, 5 Drawing Figures

FIG_1
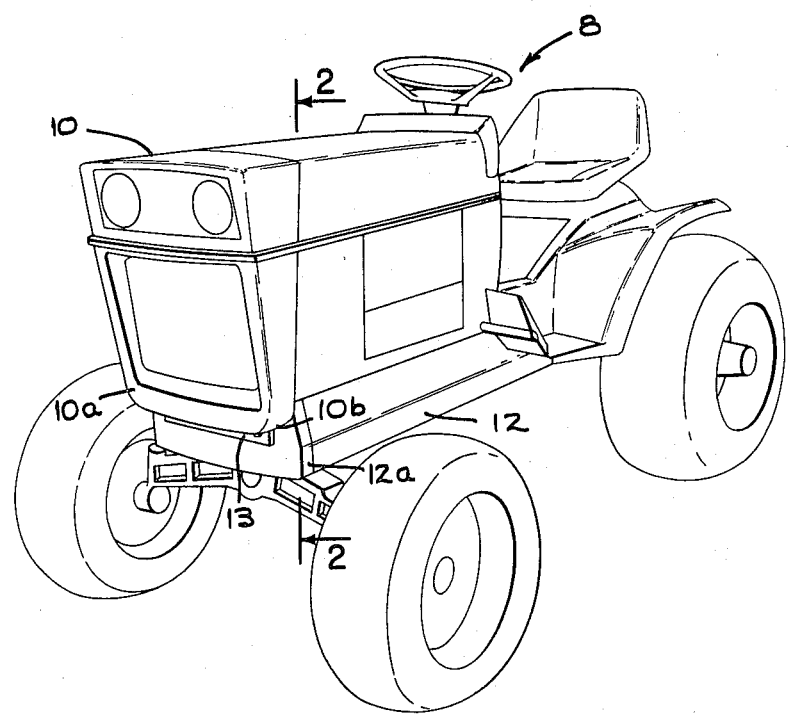

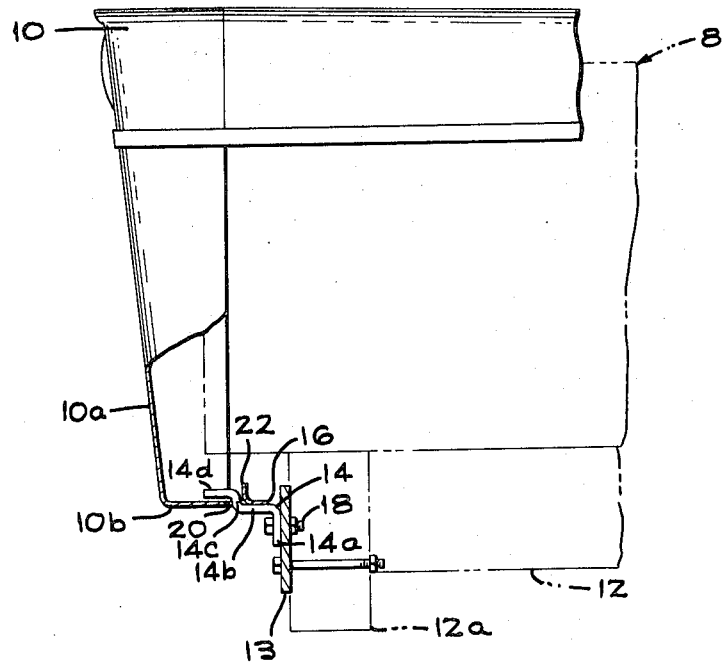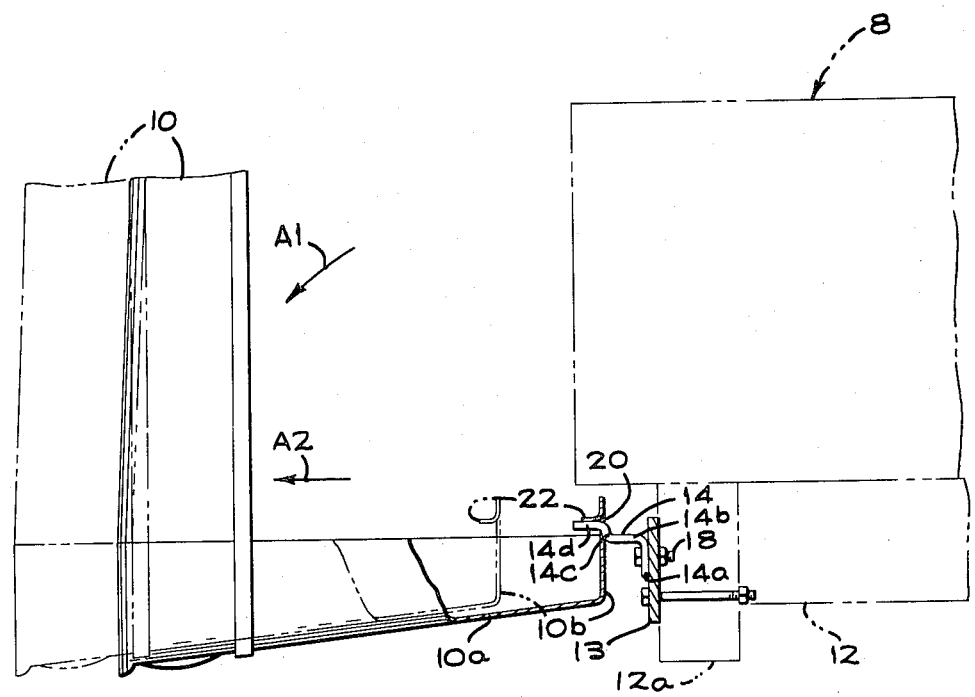

HOOD PIVOT FOR DETACHABLY CONNECTING A TRACTOR HOOD TO A TRACTOR FRAME

BACKGROUND OF THE INVENTION

1. Field of the Invention

The present invention relates to a pivot bracket connection between the hood and frame of a tractor wherein the hood is pivotally attached to the frame by a bracket so that the hood can be quickly attached to or detached from the frame. The invention more broadly relates to a hood pivot bracket utilized to pivot a hood on a vehicle frame.

2. Description of the Prior Art

Garden and lawn tractor vehicles are well known. The HUSKY tractor, model 1256, for example, manufactured by the BOLENS Division of FMC Corporation is one such tractor which is quite popular. This particular BOLENS tractor has a hood that overlies and covers the front end of the tractor frame, the hood extending forwardly over the frame then downward to the front end of the frame whereat the hood is hinged to the frame by a conventional hinge consisting of two hinge leafs, one of which is bolted to the frame and the other of which is bolted to the hood, hinged together by a hinge pin. The hinge allows the hood to be swung forward in order to expose to the tractor engine and other tractor parts to facilitate maintenance of the tractor.

It is sometimes necessary or desirable to detach the hood from the frame to facilitate maintenance work on the tractor. On such occasions, the hinge bolts attaching the hinge to the hood may be removed by holding the rear end of the hood up at an angle to the frame to gain access to the hinge bolts with a wrench which is used to unbolt the hood from the hinge. This hood detaching procedure can take several minutes and cannot be performed without the wrench.

The detached hood is reattached to the tractor frame by positioning the hood in front of the tractor and re-bolting the hood to the hinge. Reattachment of the hood can be done by one person but it is awkward for one person to do this by himself due to the necessity for aligning the hood with the frame in order to be able to bolt the hood to the hinge. It is much easier to have another person hold the hood while it is being bolted to the hinge.

In view of the effort and time required to attach or detach the hood it is clear that the use of a hinge to pivot the hood to the frame is not altogether satisfactory, and is a feature not especially attractive to persons using the tractor from day to day. Also, the labor cost involved in hinging the hood to the frame in the factory is a cost that is desirable to reduce.

In light of the foregoing, it is apparent that it is desirable to provide a way to pivotally mount the hood to the frame without using a conventional hinge and to so attach the hood to the frame that it is possible for one person to conveniently attach or detach the hood in a matter of seconds.

SUMMARY OF THE INVENTION

Accordingly, it is a main object of the present invention to provide a means of detachably securing a hood to the frame of a tractor, or a similar vehicle, without using a conventional hinge, in such a way that the hood can be detached from the frame in a matter of seconds.

It is another object of the invention to pivotally mount the hood to the frame in a manner that does not require the use of a wrench in attaching the hood to the frame and in detaching the hood from the frame.

It is another object of the invention to achieve the above objects through the use of a hood pivot bracket, in lieu of a hinge, secured to the tractor vehicle frame and adapted to allow the hood to be pivoted about the bracket and swung to an angular position wherein the hood can be freed from and separated from the bracket, by simply pulling the hood forward and away from the frame. This object is attained by a hood supporting bracket secured to the tractor vehicle frame and which pivotally mounts the hood in such a manner that the hood can be readily detached from the frame by merely swinging or pivoting the hood about the bracket and then pulling the hood forwardly away from the bracket and frame. The hood can be reattached to the bracket by reversing the procedure just described.

The above and other objects of the present invention as well as advantages and features of the invention, will be made more clear upon review of the following discussion of an embodiment of the invention taken in conjunction with the accompanying drawings.

BRIEF DESCRIPTION OF THE DRAWINGS

FIG. 1 is a perspective view of a lawn and garden tractor having a hood pivoted to the tractor frame at the lower front end of the hood.

FIG. 2 is a fragmentary side elevation taken in the direction of arrows 2—2 of FIG. 1, with portions broken away to show the manner in which a bracket is used to pivot the hood on the tractor frame.

FIG. 3 is a view similar to that of FIG. 2 but with the hood shown in such angular position that it can be detached from the frame and bracket by merely moving the hood forwardly relative to the frame.

DESCRIPTION OF THE PREFERRED EMBODIMENT

Figure 4:
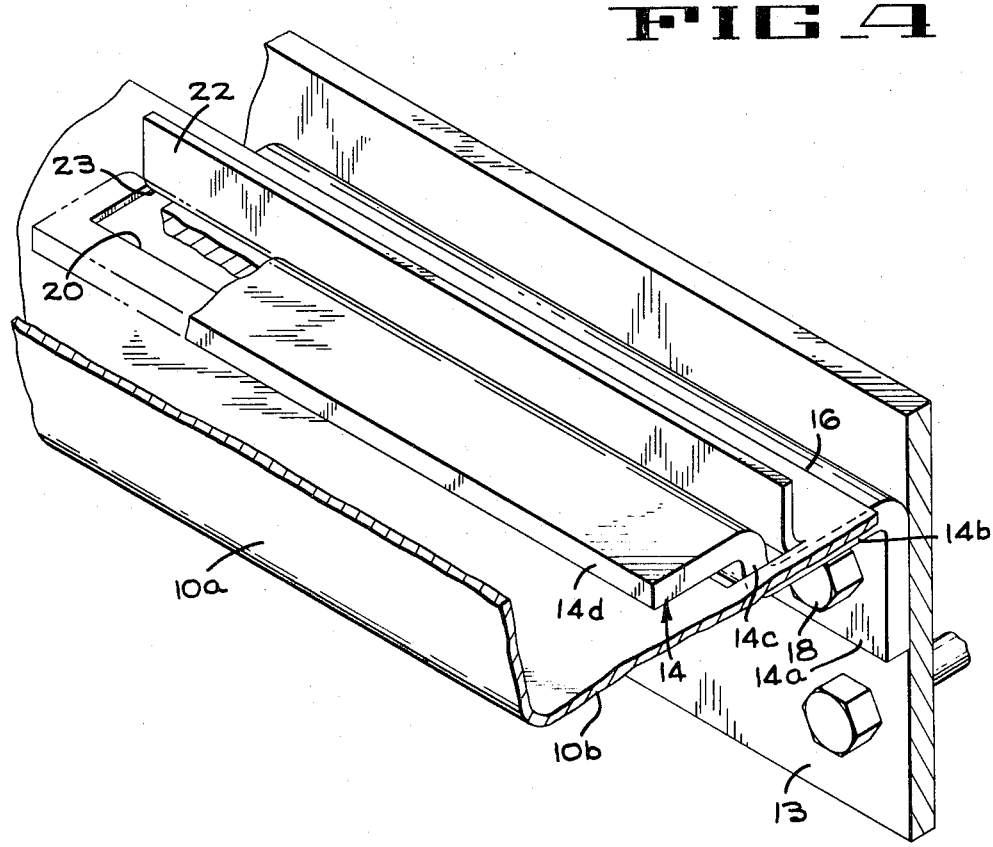
FIG. 4 is an enlarged perspective view, showing the relationship of the hood to the bracket which is secured to a frame member.

A lawn and garden tractor 8 is illustrated in perspective in FIG. 1. This tractor is, in this instance, similar or identical to the model 1256 BOLENS tractor mentioned earlier; the tractor having been modified to eliminate the aforementioned hinge therein by replacing it with the bracket of the present invention. The tractor 8 has a hood 10 disposed over the tractor frame 12, forwardly of the tractor seat, to cover the tractor engine and other tractor parts. In FIG. 1, the hood 10 is shown in closed position over the tractor frame to enclose the engine and other component parts mounted on the frame 12. The hood 10 can be swung forwardly about its lower front end portion to an angular position allowing access to the frame mounted tractor components.

The present invention is illustrated in FIGS. 2-5 wherein the lower front end 10a of the hood is detachably secured to a front transverse tractor frame member 12a by means of a plate 13 which plate mounts a bracket 14. As is shown in the Figures, the front end 10a of the hood has a rearwardly extending bottom flange portion 10b ending at an inward or rearward edge 16 situated directly in front of the frame plate 13. A laterally oriented slot or opening 20, about 10 inches long and a width "W" (FIG. 5) of about 1.5 inches wide, is provided in the flange portion 10b by stamping out a section thereof to form a vertical upstanding lip 22 at the side of the opening 20 closest to hood edge 16. The lip 22 structurally reinforces and stiffens the hood flange 10b and provides a radiused corner 23 at the rear side of opening 20 to facilitate rocking of the hood 10 about the bracket 14. The opening 20 is rectangular (see FIGS. 4 and 5) with its width dimension "W", transverse to the slot length, being sufficiently large to freely receive a portion of the bracket 14 in a manner to be explained and with its lengthwise dimension slightly longer than the lateral dimension of the bracket 14.

Figure 5:
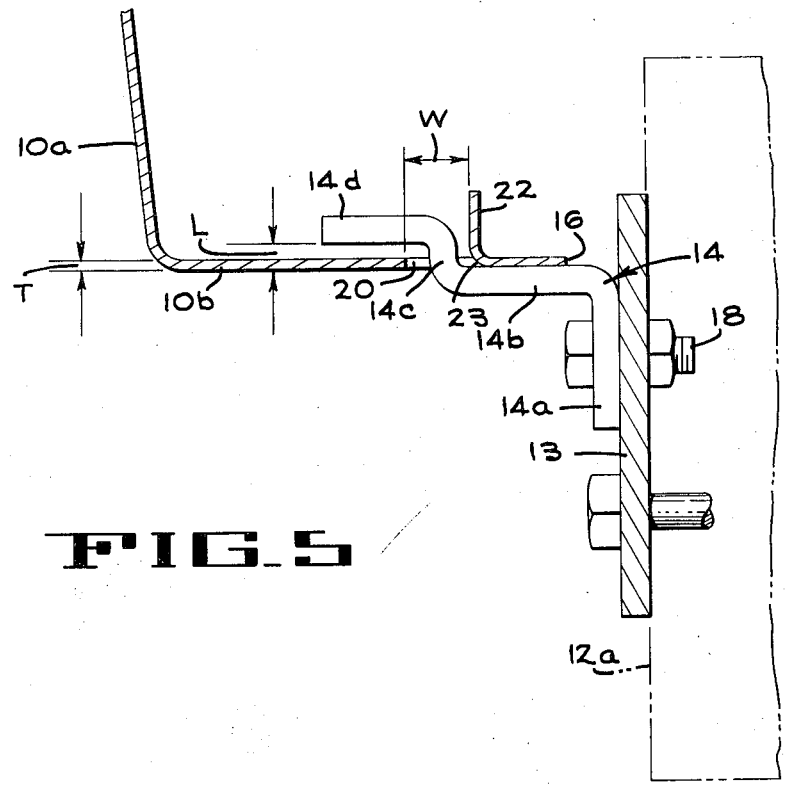
FIG. 5 is an enlarged view of the hood, bracket and frame member shown in FIG. 2.

The bracket 14 is a sheet metal member slightly less than 10 inches wide, bent at three places to form four integral legs 14a, 14b, 14c and 14d. The end leg 14a and intermediate leg 14c are vertical, upstanding legs and the intermediate leg 14b and end leg 14d are horizontal, forwardly extending legs. The bracket leg 14a is a mounting leg, secured to the frame plate 13. The bracket leg 14b is a horizontal main support leg that supports the hood when it is closed. The vertical bracket leg 14c retains the hood when it is closed, and the horizontal bracket leg 14d temporarily supports the hood when it is open. The end leg 14d is vertically offset from and situated somewhat higher than the intermediate leg 14b by a distance "L" that is somewhat greater than the thickness "T" of the hood flange portion 10b (FIG. 5). The bracket 14 is fastened to frame member 12a by bolts 18 securing the end leg 14a to frame plate 13.

The hood 10 is assembled with the frame 12 in the relation shown in FIGS. 1, 2, 4 and 5 by first bringing the hood 10 into position in front of the tractor 8, holding the hood in an angular attitude shown by phantom lines in FIG. 3, aligning the free, forward end of the bracket end leg 14d with the hood slot opening 20, and moving the hood 10 rearwardly toward the frame 12 to insert the bracket end leg 14d into the hood slot opening 20. The bracket leg 14c is now freely situated within the hood opening 20, so that the hood lip 22 overlies the bracket leg 14. The hood is then pivoted upward about the bracket 14 until the rearmost portion of flange portion 10b seats upon the bracket leg 14b and the forward portion of flange portion 10b underlies the bracket leg 14d, with the two latter parts being in spaced relation to each other by the distance "L", as shown in FIG. 5. With the hood 10 in the position shown in FIGS. 1, 2 and 5, the rear end of hood 10 may be releasably engaged in closed position by conventional means not shown.

To detach the hood 10 from the frame 12, the hood 10 is released from its closed position and swung 90° about bracket 14, in the direction of arrow A1 in FIG. 3 to the angular position shown in FIG. 3, until the hood lip 22 overlies and rests on the bracket leg 14d. The so positioned hood 10 is next moved forwardly away from the frame 12 and bracket 14, in the direction of arrow A2 in FIG. 3, to effect withdrawal of the hood from the bracket leg 14d through opening 20, to thereby detach the hood.

The dimensions of the hood opening 22 relative to the bracket dimensions ensure that the desired swinging movements of the hood can be accomplished. Since the width "W" of slot opening 20 is greater than the thickness of bracket legs 14c and 14d, a clearance gap exists within the slot opening 20 between the bracket leg 14c and the front and rear sides of the opening 20. The vertical offset "L" (FIG. 5), between the bracket legs 14b and 14d provides a vertical gap between leg 14d and the flange portion 10b whenever the hood is disposed as shown in FIG. 1. This gap allows the hood to be readily attached to the bracket in the shown manner even though the flange 10b has been inadvertently slightly bent.

The foregoing description has had particular reference to use of a bracket to connect a tractor hood to a tractor frame. The main advantage gained by this use of bracket is the relative ease with which the hood can be attached to or detached from the frame in a matter of seconds without using a wrench or other tool. Another advantage is that the hood can be swung about 45° into an open position, to gain access to frame mounted parts, without resulting detachment of the hood from the frame. The rear end of the hood may be connected to the underlying frame by means of link arms, a lanyard or the like (not shown) to hold the hood in the open position and to restrict the angle of movement of the hood relative to the frame so that the hood can not be detached from the bracket until after the link arms connection, or the like, have been disconnected from the hood.

In the illustrated embodiment, the hood is pivoted to the tractor frame by means of a single bracket 14 and a single slot opening 20 in the hood flange 10b. These elements cooperate to vertically and horizontally locate the hood, relative to the tractor frame, during its attachment or detachment to or from the frame. This feature allows for convenient removal and replacement of the hood by one person. It is possible to modify the illustrated structure to provide two laterally spaced slot openings in the hood flange 10b and to provide two laterally spaced brackets, each similar to bracket 14, secured to the frame member 12a in lieu of the single bracket 14. In this modification, the two brackets would each support the hood flange 10b in a manner similar to that shown except that each bracket would support a respective lateral side of the flange 10b by extending through a corresponding slot opening in the same way bracket 14 extends through flange opening 20.

Although the best mode contemplated for carrying out the present invention has been herein shown and described, it will be apparent that modification and variation may be made without departing from what is regarded to be the subject matter of the invention.

I claim:

1. In a vehicle having a frame and a hood, means for pivotally mounting said hood on the frame, comprising a rigid hood pivot bracket, means for securing said bracket to a vehicle frame member, said bracket having a generally horizontal hood support leg terminating in an upwardly projecting hood retaining leg, said hood having a horizontal mounting flange formed with an opening therein, said hood retaining leg of the bracket extending up through the opening of the hood flange, and said main supporting leg of the bracket being disposed under the hood flange and in supporting engagement therewith when the hood is closed, said hood flange opening accommodating swinging of the hood flange about the bracket from a closed position of the hood to an open position of the hood, said hood being detachable from the bracket when the hood is open by pulling the hood flange over the bracket, said bracket including a rigid temporary hood supporting leg projecting forwardly from the upper end of said hood retaining leg over a portion of said hood flange, an edge of the opening in said hood flange resting on said temporary support bracket leg when the hood is open but before it is slidably removed from the forward end of said temporary hood supporting leg.

2. In a vehicle having a frame and a hood, means for pivotally mounting said hood on the frame, comprising a hood pivot bracket, means for securing said bracket to a vehicle frame member, said bracket having a generally horizontal hood support leg terminating in an upwardly projecting hood retaining leg, said hood having a horizontal mounting flange formed with an opening therein, said hood retaining leg of the bracket extending up through the opening of the hood flange, and said main supporting leg of the bracket being disposed under the hood flange and in supporting engagement therewith when the hood is closed, said hood flange opening accommodating swinging of the hood flange about the bracket from a closed position of the hood to an open position of the hood, said hood being detachable from the bracket when the hood is open by pulling the hood flange over the bracket, said bracket including a temporary hood supporting leg projecting forwardly from the upper end of said hood retaining leg, and a narrow flange projecting from the inside of said hood flange, said narrow flange being generally parallel to said retaining bracket leg when the hood is closed, said narrow flange resting on said temporary supporting bracket leg when the hood is open but before it is removed from said bracket.

3. Means for attaching a hood to a vehicle frame so that the hood can be swung to an angular position wherein it can be detached from the frame, the means comprising:

a bracket having means for attachment to the frame, the bracket including three legs forming a forwardly extending part of the bracket, the three legs including a forwardly projecting main hood support leg, an upstanding hood retaining leg, and a temporary hood support leg projecting from said retaining leg, the retaining leg interconnecting the two supporting legs so that the supporting legs are vertically offset and with the temporary hood support leg being at a higher elevation than the main hood support leg, the hood including a rearwardly extending flange having an opening formed therein, the rearwardly extending flange of the hood being pivotally mounted on the bracket, said hood retaining leg of the bracket projecting upwardly through the hood flange opening when the hood is closed, said temporary support leg of the bracket thereupon extending forwardly over the hood flange and in vertically spaced relation thereto and said main hood support leg of the bracket thereupon extending rearwardly under the hood flange for supporting the same, said hood flange opening being sized so that the said retaining leg of the bracket projects loosely therethrough; pivoting of the hood to its open position about the bracket causing said hood flange to swing to an angular position wherein the hood flange opening clears the bracket and hence the hood may be moved generally forwardly along the bracket for detachment of the hood from the bracket.

4. The assembly of claim 3 wherein said hood flange opening is a narrow slot, the side walls of which embrace the retaining leg of said bracket when the hood is closed, but which slidably receives the temporary support leg of the bracket when the hood is open.

5. The assembly of claim 4 wherein a narrow upstanding flange forms the inner boundary of said slot in the hood flange.

6. The combination of a hood, a rigid hood pivot bracket, and a vehicle frame to be covered by the hood, means for securing said bracket to a frame member, said bracket having a generally horizontal hood support leg terminating in a generally vertical hood retaining leg, a hood portion including an opening therein, said hood retaining bracket leg extending through the opening of the hood portion and said main supporting bracket leg being disposed under the hood portion in contact therewith to provide support for the hood when it is closed, said hood opening accommodating swinging of the hood about the bracket from a closed position wherein the hood covers the frame to an open position wherein the hood can be detached from the bracket by pulling the hood awaY from the bracket, said bracket including a rigid temporary hood supporting leg projecting at an angle and forwardly from the upper end of said hood retaining leg, an edge of said hood opening resting on said rigid temporary support bracket leg when the hood is open but before it is slidably removed from the forward end of said temporary hood supporting leg.

7. The combination of a hood, a hood pivot bracket, and a vehicle frame to be covered by the hood, means for securing said bracket to a frame member, said bracket having a generally horizontal hood support leg terminating in a generally vertical hood retaining leg, a hood portion including an opening therein, said hood retaining bracket leg extending through the opening of the hood portion and said main supporting bracket leg being disposed under the hood portion in contact therewith to provide support for the hood when it is closed, said hood opening accommodating swinging of the hood about the bracket from a closed position wherein the hood covers the frame to an open position wherein the hood can be detached from the bracket by pulling the hood away from the bracket, said bracket including a temporary hood supporting leg projecting at an angle from the upper end of said hood retaining leg, and an inside flange on said hood that is perpendicular to said retaining leg when the hood is closed and which rests on said temporary supporting leg when the hood is open.

8. Means for attaching a hood to a vehicle frame so that the hood can be swung to an angular position wherein it can be detached from the frame, the means comprising: a bracket suitably secured to the frame, the bracket including three legs forming a forwardly extending part of the bracket, the three legs including a forwardly projecting hood supporting leg, an upstanding hood retaining leg, and a temporary hood support leg projecting from said retaining leg, the retaining leg interconnecting the two supporting legs so that the supporting legs are vertically offset and with the temporary support leg being at a higher elevation than the supporting leg, the hood including a rearwardly extending portion including an opening therein, the rearwardly extending portion of the hood being pivotally mounted on the bracket, said retaining bracket leg projecting upwardly through the hood opening when the hood is closed, said temporary support leg thereupon extending forwardly over the rearwardly extending portion of the hood and in vertically spaced relation thereto, said temporary support bracket leg extending rearwardly under the rearwardly extending portion and supporting the same, the aforesaid opening being sized so that the second bracket leg projects loosely therethrough, whereby the hood may be pivoted about the bracket to an angular position wherein the hood may be moved generally forwardly and away from the bracket to carry the aforesaid opening forwardly along the first bracket leg beyond the free end thereof to thereby detach the hood from the bracket.

9. The means of claim 8 wherein the aforesaid opening is formed by stamping out part of the hood's rearwardly extending portion to form an upstanding leg at the rearward side of the aforesaid opening.

* * * * *